(12) United States Patent
Maercklein

(10) Patent No.: US 6,565,697 B1
(45) Date of Patent: May 20, 2003

(54) MANUFACTURING METHOD FOR A POSITIONABLE AND REPOSITIONABLE PRESSURE SENSITIVE ADHESIVE PRODUCT AND AN ARTICLE FORMED THEREFROM

(75) Inventor: Eric J. Maercklein, Whitefish Bay, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 106 days.

(21) Appl. No.: 09/794,514

(22) Filed: Feb. 27, 2001

Related U.S. Application Data
(60) Provisional application No. 60/186,186, filed on Mar. 1, 2000.

(51) Int. Cl.[7] .................................................. C09J 5/04
(52) U.S. Cl. ................. 156/289; 156/275.5; 156/275.7; 156/277; 156/314; 428/141; 428/343; 428/345; 428/346; 428/352
(58) Field of Search .......................... 156/272.2, 275.5, 156/275.7, 277, 289, 290, 291, 314; 428/40.1, 41.8, 141, 143, 343, 345, 346, 352

(56) References Cited

U.S. PATENT DOCUMENTS

| | | | |
|---|---|---|---|
| 3,301,741 A | 1/1967 | Henrickson et al. | 161/119 |
| 3,314,838 A | 4/1967 | Erwin | 156/71 |
| 3,331,729 A | 7/1967 | Danielson et al. | 161/162 |
| 3,554,835 A | 1/1971 | Morgan | 156/234 |
| 3,691,140 A | 9/1972 | Silver | 260/78.5 |
| 4,023,570 A | 5/1977 | Chinai et al. | 128/290 R |
| 4,054,697 A | 10/1977 | Reed et al. | 428/40 |
| 4,151,319 A | 4/1979 | Sackoff et al. | 428/40 |
| 4,166,152 A | 8/1979 | Baker et al. | 428/522 |
| 4,376,151 A | 3/1983 | Parrotta | 428/323 |
| 4,556,595 A | 12/1985 | Ochi | 428/143 |
| 4,735,837 A | 4/1988 | Miyasaka et al. | 428/40 |
| 5,008,139 A | 4/1991 | Ochi et al. | 428/40 |
| 5,141,790 A | 8/1992 | Calhoun et al. | 428/40 |
| 5,296,277 A | 3/1994 | Wilson et al. | 428/40 |
| 5,344,693 A * | 9/1994 | Sanders | 428/107 |
| 5,346,766 A | 9/1994 | Otter et al. | 428/355 |
| 5,591,290 A | 1/1997 | Walter et al. | 156/152 |
| 5,795,636 A | 8/1998 | Keller et al. | 428/40 |
| 5,866,220 A * | 2/1999 | Rusincovitch et al. | 156/277 |
| 6,020,062 A * | 2/2000 | Questel et al. | 428/354 |

FOREIGN PATENT DOCUMENTS

| | | | |
|---|---|---|---|
| GB | 1541311 | 2/1979 | B32B/7/04 |

* cited by examiner

Primary Examiner—Michael W. Ball
Assistant Examiner—John T. Haran
(74) Attorney, Agent, or Firm—Quarles & Brady LLP

(57) ABSTRACT

A method of making a pressure sensitive adhesive article includes depositing a layer of liquid adhesive material onto a substrate, and depositing a layer of non-adhesive liquid material onto the liquid adhesive material, wherein the non-adhesive liquid material covers only a portion of the liquid adhesive layer. The liquid layers can be cured which allows winding the article onto a spool. The pressure sensitive adhesive article includes a substrate with a liquid adhesive layer deposited onto the substrate. At least one liquid non-adhesive structure is deposited onto a portion of the liquid adhesive layer, and the structure can have a theoretical angle of contact with the adhesive layer which is greater than 0°.

20 Claims, 2 Drawing Sheets

MANUFACTURING METHOD FOR A POSITIONABLE AND REPOSITIONABLE PRESSURE SENSITIVE ADHESIVE PRODUCT AND AN ARTICLE FORMED THEREFROM

This application claims the benefit of No. 60/186,186 filed Mar. 1, 2000.

CROSS REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

This invention relates to adhesive articles with positionable and repositionable bonding properties, and more particularly to adhesive articles having a discontinuous layer of non-adhesive material applied onto a layer of adhesive material.

BACKGROUND OF THE INVENTION

Traditional pressure sensitive adhesive (PSA) sheets, films, and tapes are sometimes difficult to apply because of the inherently tacky adhesive surface. Specifically, precise positioning of a tacky or "quick stick" adhesive product is difficult once adhesive contact has been made with a mounting surface, because it is difficult to slide or reposition the product. Also, air entrapment between the PSA article and mounting surface is a problem with dimensionally large PSA products. Additionally, "blocking" or adhesive-to-adhesive contact is problematic for dimensionally large products or thin gauge PSA products during pre-application handling.

The term "positionable" is used herein to indicate a PSA article with a sufficiently low degree of tack (or no tack) to allow the adhesive surface to be slid across the mounting surface without sticking or grabbing. The term "repositionable" is used herein to indicate a PSA article that can be engaged with pressure to the mounting or application surface in a final manner, then removed therefrom, and then reapplied without significant degradation of positionable feature.

In some instances consumers may desire special PSA functional properties. For example, when using a PSA sheet, film, or tape as a protective covering, a consumer may want to selectively "activate" only certain areas of the adhesive surface with pressure (i.e., just the edges of the PSA product) rather than across the entire adhesive surface of the PSA product. This feature would be applicable for wrapping or sealing applications. Additionally, consumers often desire a repositionability feature, allowing the product to be used a number of times while retaining the initial low-tack or no-tack properties.

Several methods and configurations have been developed to make application of PSA films and tapes easier. Frequently, application aids such as detergent and water have been used to reduce initial tack and impart positionable features in a typically non-positionable PSA product. Formulations vary, but typically include water, a surfactant or lubricant, and/or a solvent (generally an alcohol) that speeds bond formation and drying. The liquids tend to form a film between the adhesive and substrate, thus preventing contact and preadhesion. Unfortunately, the liquid is difficult to remove and is seldom completely removed. Additionally, most application aids affect the adhesive properties and prevent rapid formation of a strong bond between adhesive and substrate. The application aids may also mar or stain the mounting surface.

Some methods involve PSA products with reduced initial contact tack, but with more permanent long-term bonding. U.S. Pat. No. 5,346,766 discloses a positionable and repositionable PSA product which has an initially non-tacky surface. These characteristics are achieved by intimately mixing a detackifying resin and detackifying particulate into the adhesive film layer. After application, adhesion does build with passage of time or from heating. However, a product that provides a rapid increase in tack and adhesion properties is often more desirable to reduce installation time. Additionally, this product has a relatively narrow range of application temperatures.

Alternatively, discontinuous coatings of non-tack or low-tack materials projecting from the adhesive surfaces have been used to prevent premature contact (i.e., adhesion before it is wanted or expected) between the adhesive and substrate. The height of these discontinuous coatings or materials creates an air gap between the adhesive layer and the substrate. At the time of application, pressure is applied to initiate adhesion. There are several variations of this general technique described in the art.

U.S. Pat. No. 4,054,697 discloses deformable particles that recover their original shape after pressure is removed. However, U.S. Pat. No. 4,054,697 points out that with resilient particles, a sufficiently strong bond must be formed to the support surface to "prevent the deformed particles from recovering to their undeformed dimensions," which "would cause the sheet material to come away from the support surface". U.S. Pat. No. 4,054,697 further points out that "it may be desirable for the pressure sensitive adhesive to be curable after the sheet material has been adhered" to "overcome any tendency of the deformed particles to recover."

U.S. Pat. Nos. 3,331,729; 3,314,838; and 6,020,062 disclose using glass microspheres, micro-particles, or micro-balloons which are either partially or fully embedded in the adhesive layer. In these constructions, application pressure to the adhesive article crushes and/or embeds the microspheres into the adhesive layer. Crushing and/or embedding the microspheres into the adhesive layer permits the bulk of the adhesive to contact the mounting surface and instantly form a strong bond. Unfortunately, the destructive nature of the application process hinders re-use or repositioning of the product.

U.S. Pat. Nos. 4,376,151; 4,556,595; and 5,008,139 disclose non-adhesive solid particles, hollow particles, powders, or talcs which are either applied on the surface of the adhesive or embedded partially in the adhesive. Once a threshold application pressure is applied, the non-adhesive solids migrate into the adhesive layer and surface adhesion increases. Again, once the solids have migrated into the adhesive layer, such products lose the repositionable features.

Alternatively, discontinuous coatings of non-tacky materials that project from a relatively planar adhesive surface have also been used to prevent preadhesion of a PSA layer during application. These adhesive films and tapes have no adhesion when placed lightly against the mounting surface. Such films are disclosed in U.S. Pat. Nos. 3,554,835; 4,023,570; 4,054,697; 4,151,319; 5,008,139; and U.K. Patent No.

1,541,311. Manufacturing methods described in these references are often somewhat complex, involving the use of relatively expensive embossed release liners or multiple drying steps.

U.S. Pat. No. 5,591,290 discloses modifying the adhesive properties of a pre-manufactured laminate or label stock by applying a discontinuous layer of non-adhesive material to the PSA article. This process involves stripping a liner off a pre-manufactured adhesive laminate, applying a non-adhesive coating, and then re-laminating the liner. Although this method may be effective for small volume production, it is costly to add this additional manufacturing step. Additionally, with this manufacturing method it is difficult to control the three dimensional shape of the non-adhesive.

Other methods for handling preadhesion include formation of brittle plastic projections on a PSA article surface, such as disclosed in U.S. Pat. No. 3,301,741, or formation of small discrete clusters of particles protruding from the adhesive surface, such as disclosed in U.S. Pat. No. 5,141,790. For example in U.S. Pat. No. 5,141,790, the particles are tacky adhesive microspheres that provided weak bonding to a substrate when applied using light application pressure and strong bonding when applied using higher application pressures. However, this multi-adhesive construction tends to be more difficult to construct and adhesive particle transfer can be a problem.

In addition, U.S. Pat. Nos. 3,691,140 and 4,166,152 disclose microsphere and patterned adhesives exhibiting repositionable properties, and U.S. Pat. No. 4,735,837 discloses deformable microspheres which provide a rough or pebble-like surface and repositionable bond. In all these cases, the adhesive films readily form weak, repositionable bonds to a substrate, but do not form a strong, permanent bond.

U.S. Pat. No. 5,296,277 discloses an adhesive sheet having a microstructure adhesive surface comprising a uniform distribution of adhesive or composite adhesive "pegs" over the functional portion of an adhesive surface. The pegs protrude outwardly from the adhesive surface, and provide a sheet that is both positionable and repositionable when it is laid on a mounting surface. Pressing the adhesive surface against the mounting surface results in an instant formation of a strong bond between the adhesive sheet and the mounting surface. Such an adhesive also required a relatively expensive coincident microstructure release liner to protect the adhesive pegs during storage and processing.

Finally, U.S. Pat. No. 5,795,636 discloses another method of making a PSA article which includes forming a topologically microstructured adhesive surface. The surface is manufactured by casting the resin to a relatively expensive embossed release liner.

As discussed above, all of the disclosed methods have disadvantages. Accordingly, a need exists for an improved PSA article, and an economical method of making a PSA article having positionable and repositionable properties.

SUMMARY OF THE INVENTION

The present invention provides a pressure sensitive adhesive article, and a method of making the article. The method includes depositing a layer of liquid adhesive material onto a substrate, and depositing a layer of non-adhesive liquid material onto the liquid adhesive material, wherein the non-adhesive liquid material covers only a portion of the liquid adhesive layer. The liquid layers can be cured which allows winding the article onto a spool.

In another aspect of the invention the pressure sensitive adhesive article includes a substrate with a liquid adhesive layer deposited onto the substrate. At least one liquid non-adhesive structure is deposited onto a portion of the liquid adhesive layer, and the structure has a theoretical angle of contact with the adhesive layer which is greater than 0°.

A general objective of the present invention is to provide a pressure sensitive article which is positionable and repositionable. This objective is accomplished by providing an article having at least one non-adhesive structure covering a portion of a layer of an adhesive material to prevent the adhesive material from contacting a surface until desired.

Another objective of the present invention is to provide an economical method of making a pressure sensitive adhesive article. This objective is accomplished by providing a method which allows a user to control the geometry of non-adhesive structures on the surface of a layer of adhesive material.

The foregoing and other objectives and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
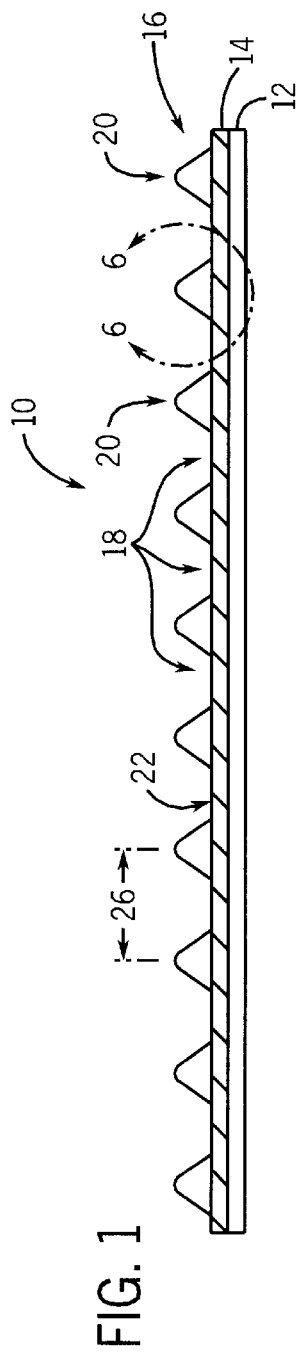
FIG. 1 is a side elevation of a pressure sensitive adhesive article incorporating the present invention.

As shown in FIG. 1, a positionable and repositionable pressure sensitive adhesive (PSA) article 10 which can be adhesively attached to a mounting surface (not shown) includes a carrier web 12 coated with a layer 14 of an adhesive material. A layer 16 of non-adhesive structures 20 is applied to the adhesive material layer 14. The non-adhesive layer 16 covers only a portion of the adhesive layer 14, such that pressing on the carrier web 12 urges exposed portions 18 of the adhesive layer 14 against the mounting surface. Advantageously, variations of this construction can produce useful PSA articles with moderate initial tacks, but not low enough to be considered positionable.

The carrier web 12, or substrate, is not critical to the invention and may be formed of a wide variety of materials in accordance with the intended application. The substrate can be any suitable material, such as plastic film, paper material, cloth, metal foil and the like suitable sheet or web material. Preferably, the substrate thickness ranges from about 0.1 mil or less to 50 mils or greater.

The adhesive material layer 14 is formed from any known adhesive which can be applied in liquid form onto the carrier web 12, and has an exposed adhesive surface 22. Preferably, the adhesive layer 14 is continuous, and has a thickness of between 5–100 microns, although a discontinuous and thicker, or thinner adhesive layer can be used without departing from the scope of the present invention.

The particular adhesive material used is dependent upon the functional performance (i.e., position ability, repositionability, and ultimate adhesion) required for a particular use. Preferably, the adhesive material is a pressure sensitive resin, such as solvent based Morstik 130 available from Rohm and Haas Company, Philadelphia, Pa. Other adhesive materials, such as acrylic resins, rubber resins, water based adhesives, UV curable adhesives, electron beam curable adhesives, and hot melt adhesives, can also be used without departing from the scope of the invention. In addition, surface energy modifiers can be used to provide desired surface energy differences between the adhesive and non-adhesive layers 14, 16.

The non-adhesive layer 16 is formed from any known non-adhesive material which can be applied in liquid form onto the adhesive layer 14. A non-tacky, non-adhesive material, such as the aqueous non-adhesive polymer, Joncryl 74 available from Johnson Polymer, Sturtevant, Wis. is preferred. Although a heat curable non-adhesive is preferred, other non-adhesive materials known in the art can be used, such as UV curable non-adhesives, electron beam curable non-adhesives, hot melt non-adhesives, and the like, without departing from the scope of the present invention.

In certain applications, a non-adhesive material having adhesive properties may be desired. Therefore, a non-adhesive material is any material which is less adhesive than the material forming the adhesive layer 14. Preferably, the adhesive and non-adhesive materials are generally immiscible in each other to minimize mixing during the drying or curing process. Alternatively, the adhesive and non-adhesive layers can be selected or modified such that the surface energy differences between the layers minimize mixing between the layers during the drying or curing process. Unintended mixing of the two materials could result in the non-adhesive layer becoming tacky, and the adhesive layer becoming less tacky.

Figure 5:
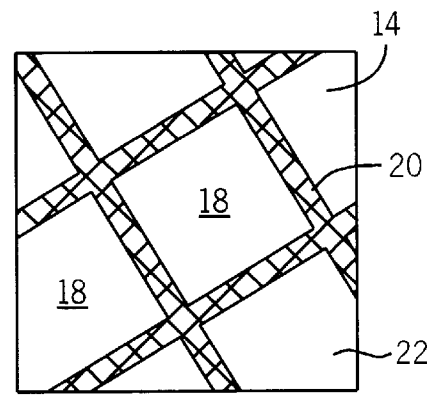
FIG. 5 is a plan view of the article of FIG. 1 showing yet another alternate pattern of the non-adhesive material.

The non-adhesive layer 16 is deposited onto the adhesive layer 14 in the form of lines, cross hatches, dots, or any other pattern which forms three-dimensional structures 20 of non-adhesive material on the adhesive surface 22 of the adhesive material. Although discrete structures 20 are preferred, a single continuous structure 20 which does not completely cover the adhesive surface 22, such as shown in FIG. 5 can be used without departing from the scope of the present invention.

Figure 6:
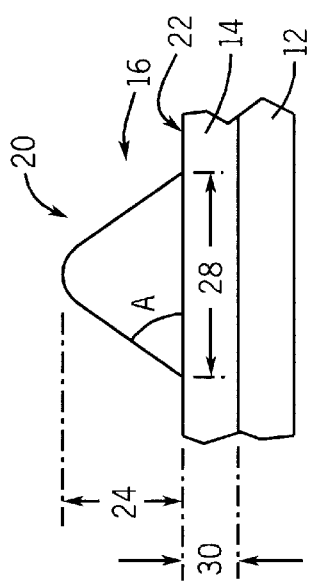
FIG. 6 is a detailed view along line 6—6 of FIG. 1.

Referring to FIGS. 1 and 6, the three dimensional shape of the non-adhesive structures 20 affects the positionability, repositionability, and the ultimate adhesion performance of the product. For example, the height 24 of the non-adhesive layer 16 defines the size of the pre-application gap between the mounting surface on which the PSA article 10 is being applied, and the adhesive surface 22, and, thus, the amount of carrier web 12 deformation required for adhesive contact. The size of the gaps 26 between non-adhesive structures 20 determines the total surface area of the exposed adhesive surface 22 available for contact.

The interface area 28 between each non-adhesive structure 20 and the adhesive surface 22 determines whether the structure 20 will embed into the adhesive material layer 14 when the PSA article 10 is fixed to the mounting surface. A large interface area 28 in relation to the adhesive material layer thickness 30 minimizes the depth in which the non-adhesive structure 20 embeds into the adhesive material layer 14. Preferably, each discrete non-adhesive structure 20 has a height 24 of approximately 2–35 microns with an interface area 28 of approximately 15–35 mils$^2$, and the gaps 26 between the non-adhesive structures 20 are approximately 15–35 mils. Of course, the actual parameters depend on the specific PSA article application.

A range of functional properties can be attained by changing the height, interface area, shape, number, and spacing of the non-adhesive structures 20. For example, in some applications, it is desirable for the adhesive surface 22 to be essentially tack free, such as a thin film (12 micron) polyethylene protective sheet that is likely to fold over on itself during pre-application handling, or an article which needs pre-application positioning. In other applications, a small degree of tack is desirable to help hold the adhesive article in place.

The three dimensional shape of the dried non-adhesive structure 20 is related to the initial liquid shape of the non-adhesive structure 20 prior to drying. The initial liquid shape of the non-adhesive structure 20 prior to drying is dependent upon the relative surface energies (tensions) of the liquid adhesive and non-adhesive materials. For example, when a liquid material is placed on a medium with a relatively lower surface energy, the material tends to "bead" into discrete structures forming a discontinuous film having a high contact angle between each structure and the medium. Alternatively, when a liquid material is placed on a medium with a relatively higher surface energy, the material tends to "spread" with a tendency to form a continuous film having a relatively lower angle of contact between the film and the medium.

It is well known that the theoretical contact angle A between two materials can be calculated using the surface energies of the two materials. In the embodiment disclosed above, the surface energy of the liquid non-adhesive material is approximately 46 dynes/cm. The surface energy of the liquid adhesive material approximately matches the surface energy of toluene, which is the primary solvent of the adhesive material. The surface energy of a toluene is approximately 28 dynes/cm. The surface energy of a dried adhesive film is typically 34 dynes/cm.

Using materials having surface energies disclosed above, the theoretical contact angle of the non-adhesive structure 20 deposited onto a liquid adhesive layer is 52°. The theoretical contact angle of the liquid non-adhesive material deposited onto the dry adhesive film is only 15° because of the greater tendency for structure spreading. Moreover, the theoretical contact angle is 0° for a liquid non-adhesive layer deposited onto an adhesive layer, wherein the surface energies of the two layers are equal.

Depositing the liquid non-adhesive material onto the liquid adhesive material rather than onto the dried adhesive material results in non-adhesive structures 20 that are relatively greater in height and smaller in interface area. Advantageously, by selecting materials having different surface energies, the surface energy mismatch can be leveraged to control the dimensional characteristics of the non-adhesive structures 20.

The initial surface energy mismatch causes the liquid non-adhesive structures 20 to increase in height and decrease in interface area 28. As a result, when transforming the liquid layers 14, 16 into relatively non-liquid layers 14, 16, such as by drying, the transformation begins with a relatively large contact angle A between the liquid non-adhesive structures 20 and the liquid adhesive layer 14. As solvent, such as toluene, water, and the like, is removed from the layers 14, 16 during the transformation process, the surface energy of the adhesive layer 14 increases. However, by initiating the transformation while the non-adhesive structures 20 have a relatively large contact angle A with the adhesive layer 14, the initial shape of the non-adhesive structures 20 is substantially preserved.

In use, the PSA article 10 is positioned against the mounting surface, such that the non-adhesive structures 20 are in engagement with the mounting surface. The PSA article 10 can be slid along the mounting surface until properly positioned. Once the proper position is achieved, a user presses against the carrier web 12 to urge the exposed portions 18 of the adhesive material layer 14 into contact with the mounting surface. The adhesive material in contact with the surface adhesively fixes the PSA article 10 to the surface.

Figure 7:
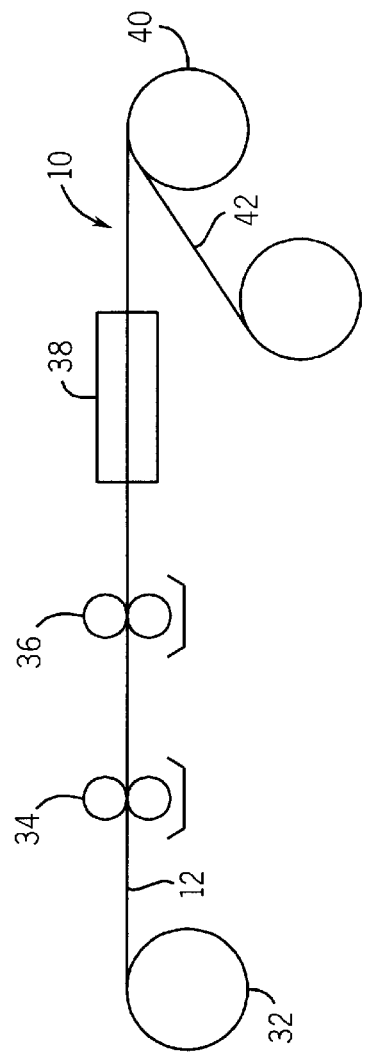
FIG. 7 is a schematic diagram of the manufacturing process.
Figure 2:
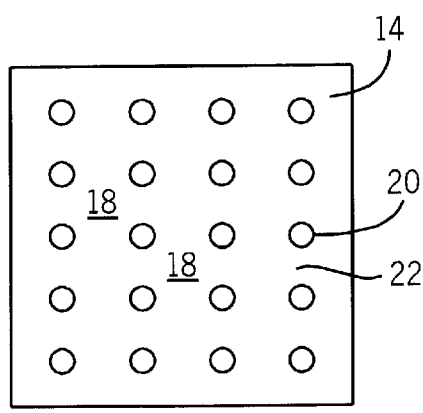
FIG. 2 is a plan view of the article of FIG. 1 showing a pattern of the non-adhesive material.
Figure 3:
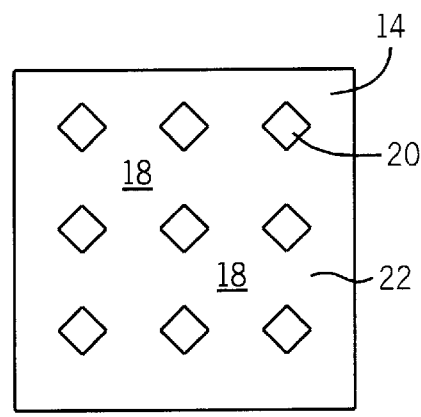
FIG. 3 is a plan view of the article of FIG. 1 showing an alternate pattern of the non-adhesive material.
Figure 4:
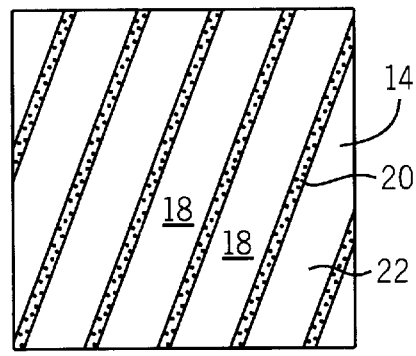
FIG. 4 is a plan view of the article of FIG. 1 showing another alternate pattern of the non-adhesive material.

Referring to FIGS. 1 and 7, the PSA article 10 is made by unwinding the carrier web 12 from a spool 32, and then passing the carrier web 12 through an adhesive coating station 34 which deposits the layer 14 of liquid adhesive material to a surface of the carrier web 12. Preferably, the adhesive coating station 34 deposits a thin continuous liquid film of the adhesive material onto the carrier web 12.

The particular coating method used to deposit the adhesive layer is not critical to the invention. Any method known in the art for depositing a layer of liquid material can be used, such as reverse roll, slot-die, meyer rod, gravure, spray coating, ink jet, and the like, without departing from the scope of the present invention.

Once the liquid adhesive layer 14 is applied onto the carrier web 12, the carrier web 12 passes through a non-adhesive coating station 36, such as a gravure cylinder, which applies the layer 16 of non-adhesive material onto the surface 22 of the liquid adhesive material layer 14. The non-adhesive material covers only a portion of the liquid adhesive material layer 14, and forms the liquid non-adhesive structures 20 on the surface 22 of the adhesive material.

During application of the non-adhesive material layer 16 onto the adhesive material layer 14, the size of the exposed portions of the adhesive layer 18 is a function of the application pressure, the initial gap size between non-adhesive material structures 20, the height and shape of the non-adhesive material structure 20, and the flexibility of the base carrier web 12. If a gravure cylinder is used, the depth and size of the pattern in the engraved gravure cylinder affects the volume and shape of the non-adhesive structures 20. Therefore, all of these parameters must be determined for a specific product application.

The particular coating method used to deposit the non-adhesive layer is not critical to the invention. Any method known in the art for depositing a layer of liquid material onto a surface without completely covering the surface can be used, such as coating methods disclosed above for the adhesive layer, and further including screen press, deckled slot-die, deckled reverse roll, and the like, without departing from the scope of the present invention.

Once the liquid non-adhesive layer 16 is deposited onto the liquid adhesive layer 14, the layers 14, 16 are cured. If at least one of the layers is solvent based, preferably, the PSA article 10 is then passed through a drying oven 38. The drying oven 38 removes water and other solvents from both the adhesive and non-adhesive layers 14, 16 to transform the layers 14, 16 from a liquid to a non-liquid having a higher viscosity than the viscosity of the layers 14, 16 prior to removing any of the solvents. Although a drying oven 38 is disclosed, other methods known in the art for removing solvents, such as natural air drying, exposing the liquid layers to a vacuum, and the like, can be used without departing from the scope of the invention. Of course, the particular method used for curing each layer is dependant upon the type of material. For example, a UV curable material would be exposed to UV light during the curing process or a radiation curable material would be exposed to an electron beam.

Once the layers 14, 16 are cured, the PSA article 10 is wound onto a take-up spool 40 for easy handling. A lamination liner 42 can be joined to the PSA article 10 to protect the layers 14, 16 prior to use. Advantageously, by using the surface energies to control the size and shape of the non-adhesive structures 20, an expensive embossed casting sheet can be eliminated, and multiple drying steps are not always necessary. In some applications, the expense of the liner 42 can be eliminated by self-winding the PSA article 10.

While there have been shown and described what are at present considered the preferred embodiments of the invention, it will be obvious to those skilled in the art that various changes and modifications can be made therein without departing from the scope of the invention defined by the appended claims.

I claim:

1. A method for making a pressure sensitive adhesive article, said method comprising:

depositing a layer of liquid adhesive material onto a substrate; and depositing a layer of liquid non-adhesive material onto said liquid adhesive material, wherein said non-adhesive liquid material covers only a portion of said liquid adhesive layer.

2. The method of claim 1, in which said liquid adhesive material has a surface energy, and said liquid non-adhesive material has a surface energy, wherein said surface energy of said liquid adhesive material is less than said surface energy of said liquid non-adhesive material.

3. The method of claim 1 further comprising curing said liquid layers to form a non-liquid non-adhesive layer covering a portion of a non-liquid adhesive layer.

4. The method of claim 3, in which curing said liquid layers includes removing solvents from at least one of said layers.

5. The method of claim 4, in which removing the solvents includes applying heat to said liquid layers.

6. The method of claim 3, in which curing said liquid layers includes exposing at least one of said layers to UV light.

7. The method of claim 3, in which curing said liquid layers includes exposing at least one of said layers to electron beam radiation.

8. The method of claim 1, in which said substrate is a carrier film.

9. The method of claim 1, in which said non-adhesive layer is substantially immiscible in said adhesive layer.

10. The method of claim 1, in which said adhesive layer is deposited using a method selected from a group consisting of reverse roll, slot-die, meyer rod, gravure, spray coating, and ink jet.

11. The method of claim 1, in which said non-adhesive layer is deposited using a method selected from a group consisting of reverse roll, slot-die, meyer rod, gravure, spray coating, ink jet, screen press, deckled slot-die, and deckled reverse roll.

12. A pressure sensitive adhesive article comprising:
a substrate;
a liquid adhesive layer deposited onto said substrate; and
at least one liquid non-adhesive structure deposited onto a portion of said liquid adhesive layer, said structure having a theoretical angle of contact with said adhesive layer which is greater than 0°.

13. The article of claim 12, in which the theoretical angle of contact is greater than 15°.

14. The article of claim 12, in which said liquid adhesive material has a surface energy, and said liquid non-adhesive material has a surface energy, wherein said surface energy of said liquid adhesive material is less than said surface energy of said liquid non-adhesive material.

15. The article of claim 12, in which said substrate is selected from a group consisting of plastic, paper, cloth, and metal.

16. The article of claim 12, in which said adhesive layer is selected from a group consisting of rubber based resin, acrylic resin, a water based adhesive, a UV curable adhesive, an electron beam curable adhesive, and a hot melt adhesive.

17. The article of claim 12, in which said non-adhesive structure is selected from a group consisting of a polymer, a UV curable material, an electron beam curable material, and a hot melt material.

18. An article made by the process of claim 1.

19. The method of claim 1, in which said liquid non-adhesive layer forms at least one structure having a theoretical angle of contact with said liquid adhesive layer that is greater than 15°.

20. The article of claim 18, in which said liquid non-adhesive layer forms at least one structure having a theoretical angle of contact with said liquid adhesive layer that is greater than 15°.

* * * * *